United States Patent
Ito

(10) Patent No.: US 6,476,977 B1
(45) Date of Patent: Nov. 5, 2002

(54) ZOOM LENS AND OPTICAL APPARATUS

(75) Inventor: Yoshinori Ito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 09/690,807

(22) Filed: Oct. 18, 2000

(30) Foreign Application Priority Data

Oct. 20, 1999 (JP) .......................................... 11-298127

(51) Int. Cl.[7] .............................................. G02B 15/14
(52) U.S. Cl. ....................................... 359/687; 359/683
(58) Field of Search ................................. 359/687, 686, 359/683–684, 676

(56) References Cited

U.S. PATENT DOCUMENTS

| | | | | |
|---|---|---|---|---|
| 4,299,454 | A | 11/1981 | Betensky | 359/687 |
| 4,824,226 | A | 4/1989 | Tanaka | 359/683 |
| RE32,923 | E | 5/1989 | Kreitzer | 359/687 |
| 5,572,364 | A | 11/1996 | Toide et al. | 359/649 |
| 5,963,378 | A | 10/1999 | Tochigi et al. | 359/687 |
| 5,966,245 | A | * 10/1999 | Nagaoka | 359/676 |
| 6,166,864 | A | 12/2000 | Horiuchi | 359/687 |

FOREIGN PATENT DOCUMENTS

| | | |
|---|---|---|
| JP | 62-024213 | 2/1987 |
| JP | 63-44614 | 2/1988 |
| JP | 63-029718 | 2/1988 |
| JP | 63-247316 | 10/1988 |
| JP | 63-278013 | 11/1988 |
| JP | 5-72472 | 3/1993 |
| JP | 5-060974 | 3/1993 |
| JP | 7-270684 | 10/1995 |
| JP | 7-318804 | 12/1995 |

* cited by examiner

Primary Examiner—Jordan M. Schwartz
(74) Attorney, Agent, or Firm—Fitzpatrick, Cella, Harper & Scinto

(57) ABSTRACT

A zoom lens including, in the order from the object end thereof, a first lens unit having positive refractive power, a second lens unit having negative refractive power and being movable during zooming, and including four single lenses, separated one from another, three of these lenses each having negative refractive power, and one lens element having positive refractive power, a third lens unit, having positive refractive power, including at least one lens having positive refractive power and having aspherical surfaces on the two sides thereof, and a fourth lens unit having positive refractive power and being movable during zooming.

10 Claims, 13 Drawing Sheets

FIG. 2A  FIG. 2B  FIG. 2C  FIG. 2D
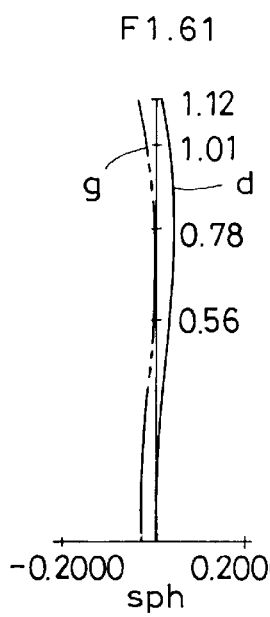
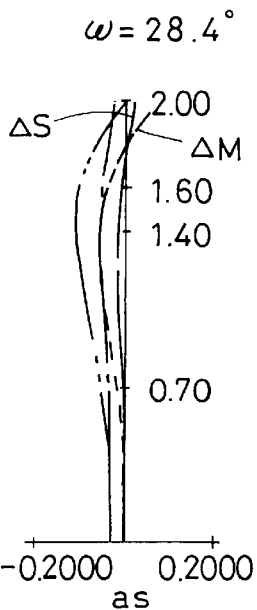
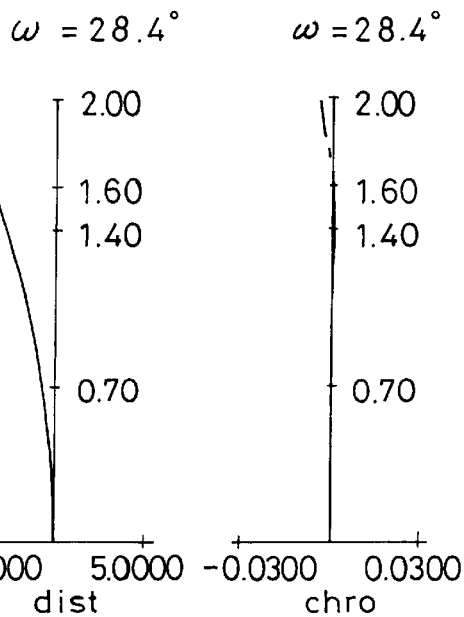
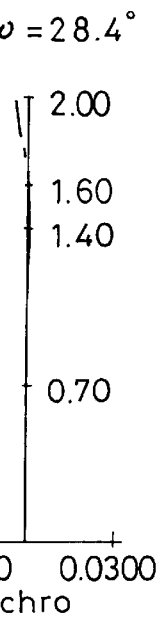
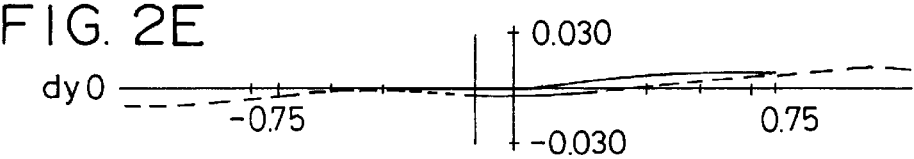
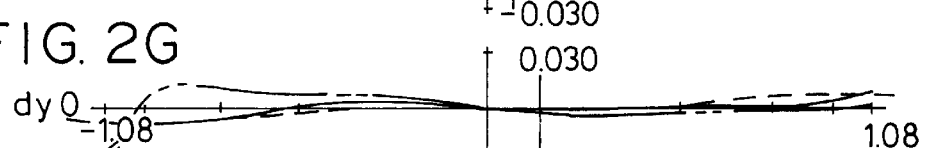
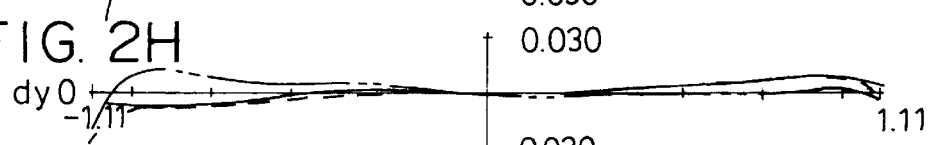
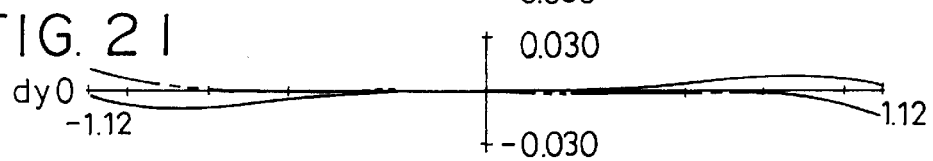

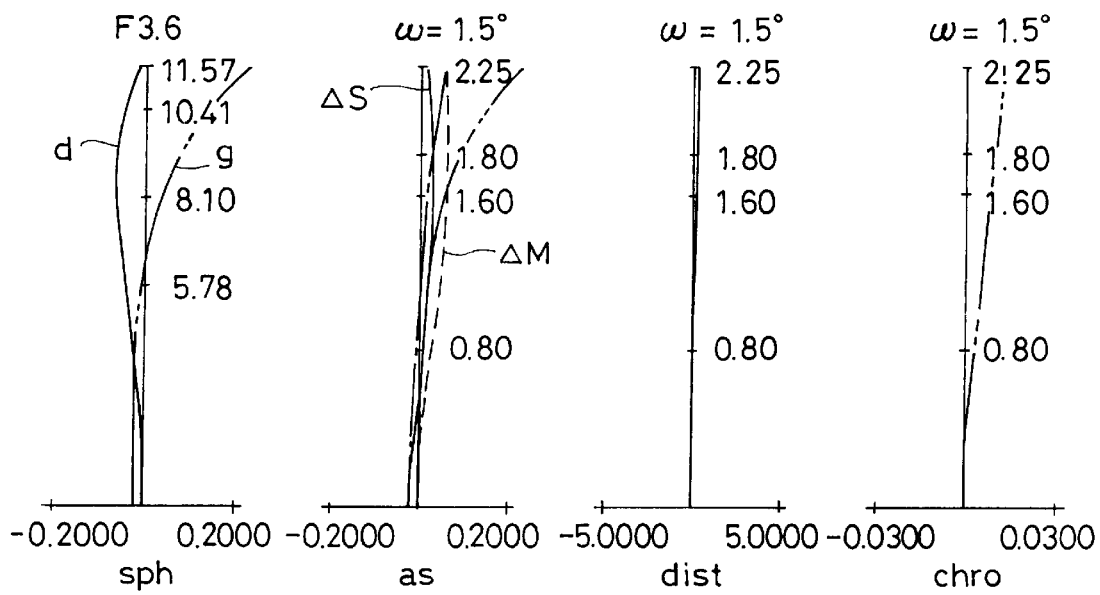
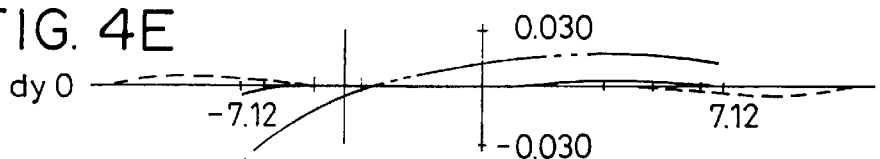
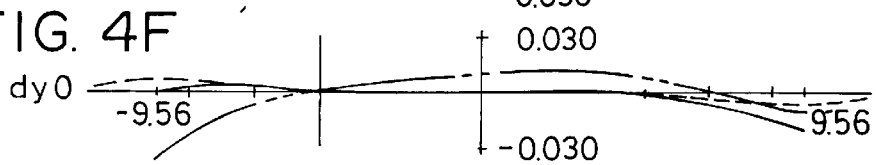
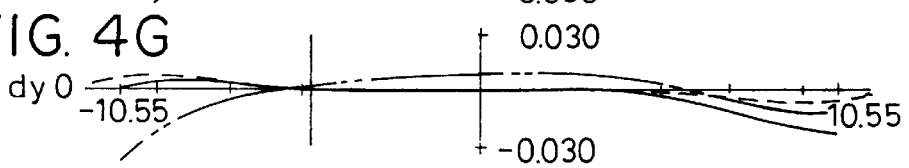
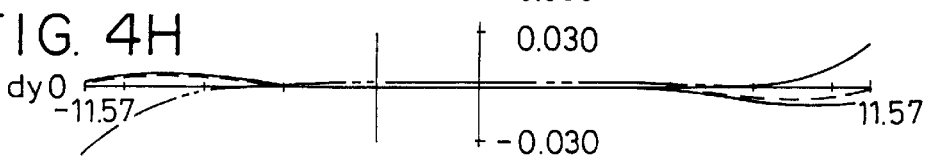
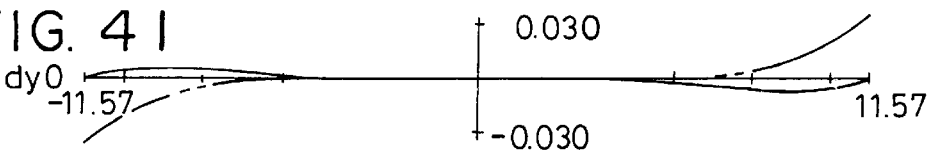

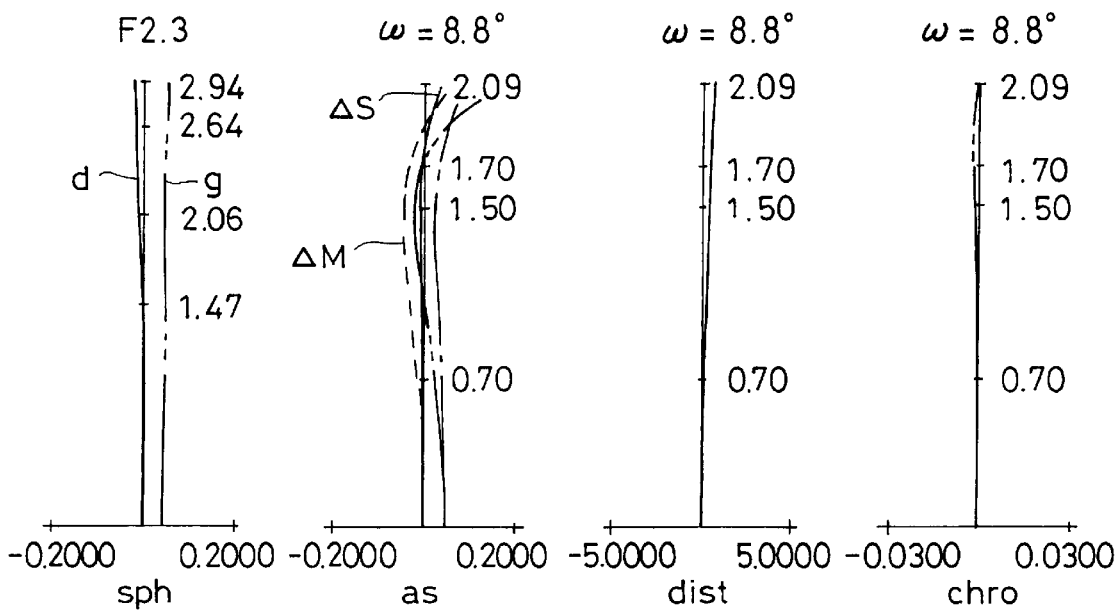
FIG. 7A  FIG. 7B  FIG. 7C  FIG. 7D
FIG. 7E
FIG. 7F
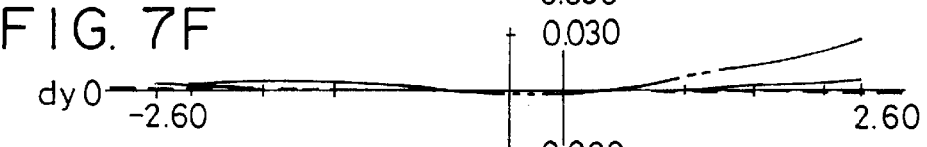
FIG. 7G
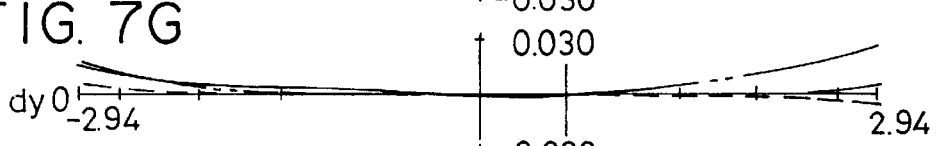
FIG. 7H
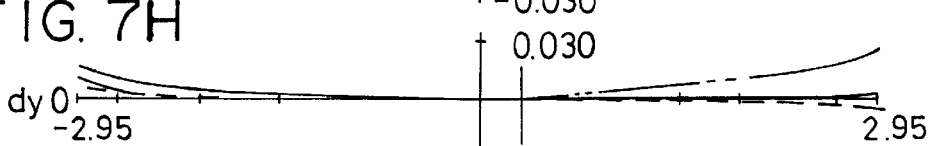
FIG. 7I
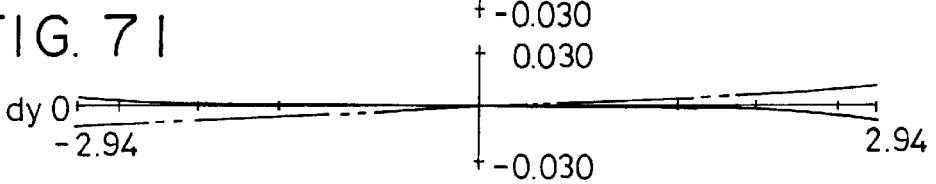

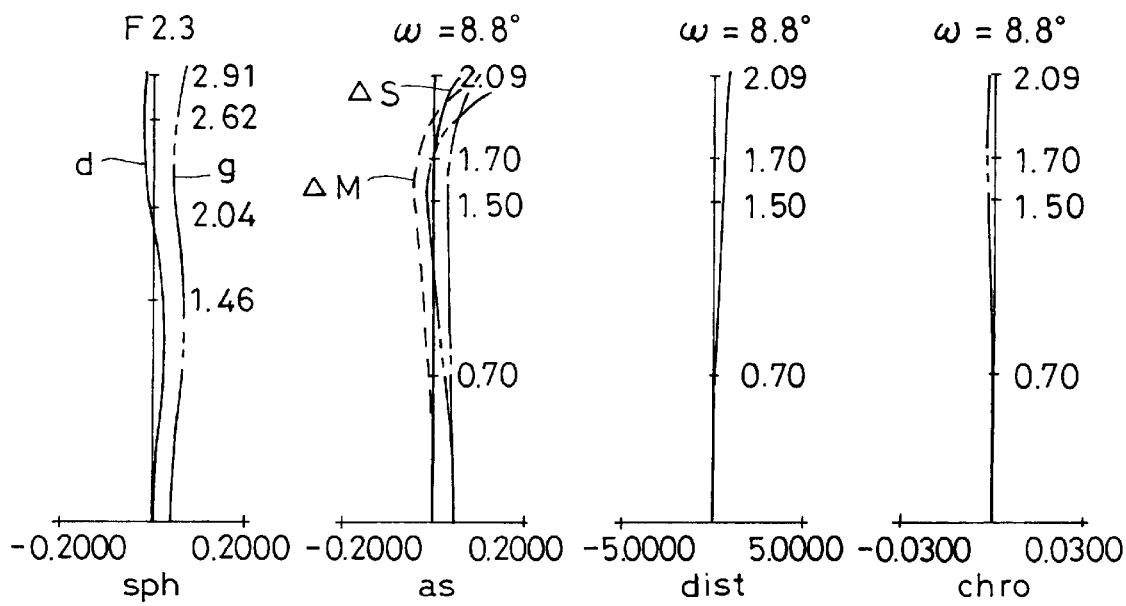
FIG. 11A    FIG. 11B    FIG. 11C    FIG. 11D
FIG. 11E
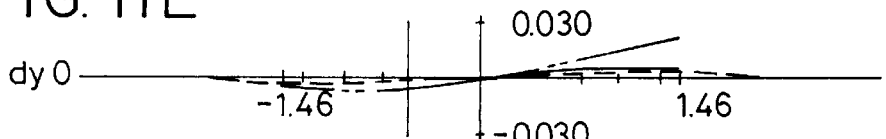
FIG. 11F
FIG. 11G
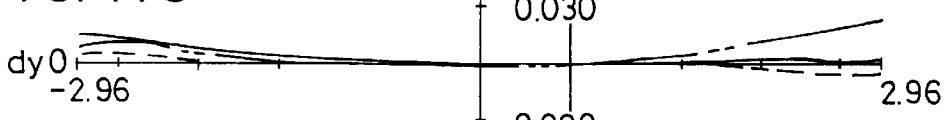
FIG. 11H
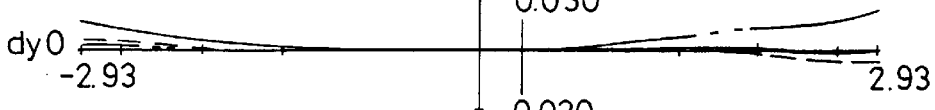
FIG. 11 I
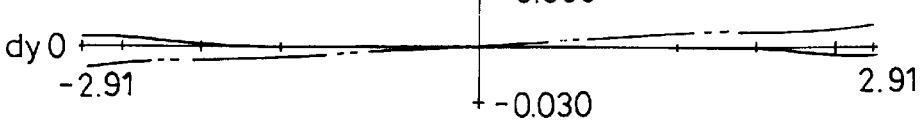

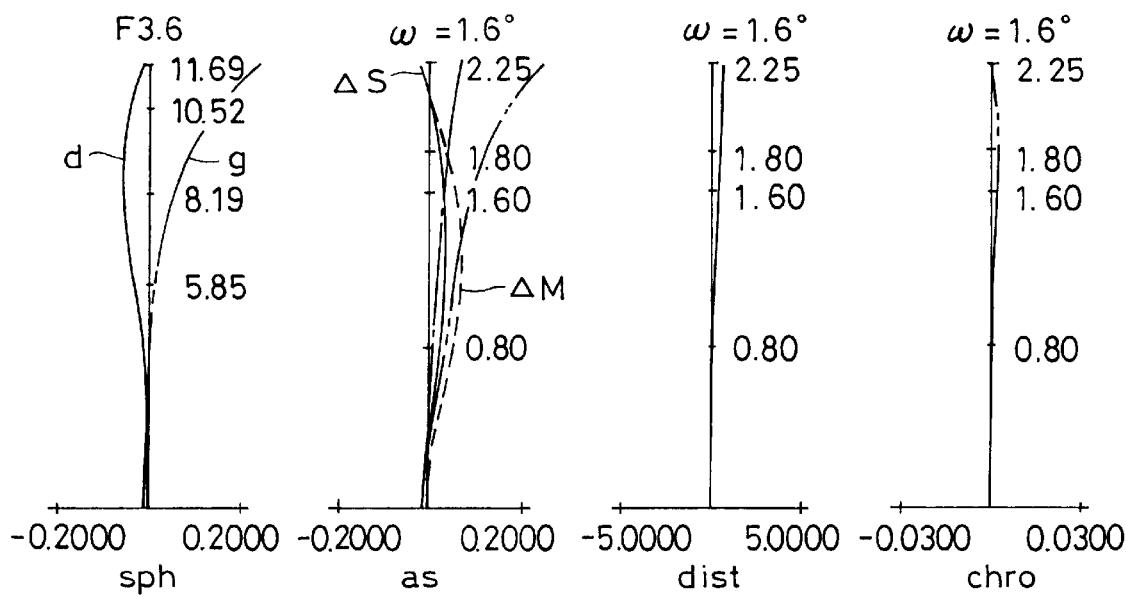
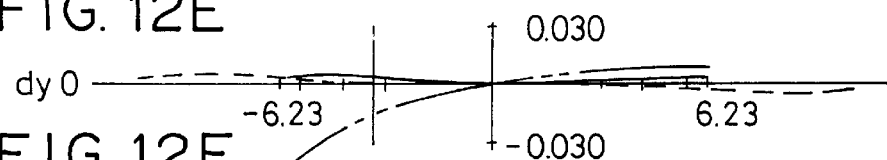
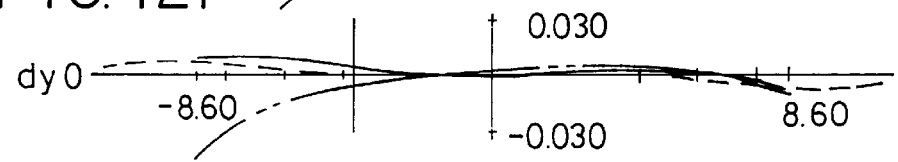
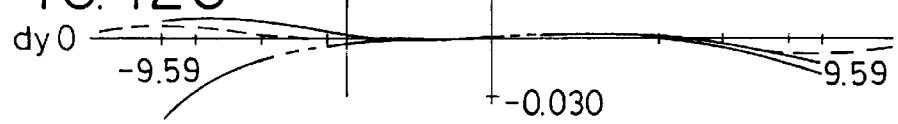
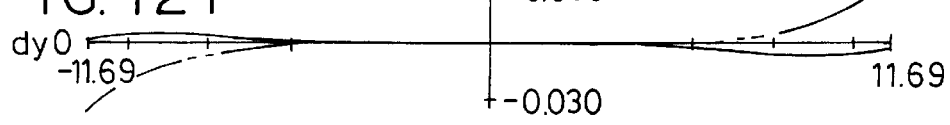

ZOOM LENS AND OPTICAL APPARATUS

BACKGROUND OF THE INVENTION

1. Field of the Invention

The present invention relates to a zoom lens and an optical device incorporating the zoom lens, and, more specifically, to a rear-focus zoom lens having a high zoom ratio with a relatively small number of lens elements, appropriate for use in a video camera, a film camera, a broadcast camera, and to an optical apparatus incorporating the zoom lens.

2. Description of the Related Art

Various rear-focus zoom lenses, which perform focusing by moving a lens unit behind a first lens unit closer to an object, have been proposed as zoom lenses used in film cameras or video cameras. Since the rear focus method moves a relatively compact and light-weight lens unit during focusing, the driving power required is small, and the focusing operation through the rear focus method is rapid enough to work compatibly with an auto-focusing system.

For instance, Japanese Patent Laid-Open No. 63-44614 discloses a so-called four-group rear-focus zoom lens which includes, in the order from the object end, a first lens unit having positive refractive power, a second lens unit for zooming having negative refractive power, a third lens unit having negative refractive power for correcting the shift of an image plane in response to zooming, and a fourth lens unit having positive refractive power. The focusing operation is performed by moving the third lens unit. The arrangement requires the space within which the third lens unit travels, and the overall length of the lens system increases.

Japanese Patent Laid-Open No. 63-278013 discloses a four-group rear-focus zoom lens which includes a first lens unit having positive refractive power, a second lens unit having negative refractive power, a third lens unit having negative refractive power, and a fourth lens unit having positive refractive power. The second lens unit effects zooming, and the fourth lens unit performs image plane correction and focusing. In the zooming method using the third lens unit having negative refractive power, diverging light rays from the second lens unit further diverge through the third lens unit. The lens diameter of the fourth lens unit increases, leading to a bulky design. Furthermore, a variation in aberration due to focusing becomes large.

Each of Japanese Patent Laid-Open No. 62-24213 and Japanese Patent Laid-Open No. 63-247316 discloses a four-group zoom lens which includes, in the order from the object end, a first lens unit having positive refractive power, a second lens unit having negative refractive power, a third lens unit having positive refractive power, and a fourth lens unit having positive refractive power. The second lens unit is moved for zooming, and the fourth lens unit is moved to correct an image plane shift arising from zooming, while effecting focusing. Compact design is thus implemented in the overall lens system.

Japanese Patent Laid-Open No. 63-29718 discloses a four-group zoom lens which includes, in the order from the object end, a first lens unit having positive refractive power, a second lens unit, composed of three lens elements of a negative lens, a negative lens and a positive lens, and generally having negative refractive power and movable for zooming, a third negative lens having negative refractive power and having an aspherical surface, and a fourth lens unit, having positive refractive power and a relatively wide air gap therewithin. The fourth lens unit corrects an image plane shift arising from zooming, while moving for focusing.

Japanese Patent Laid-Open No. 5-72472 discloses a four-group zoom lens which employs aspherical surfaces and includes, in the order from the object end, a first lens unit having positive refractive power and remaining stationary during zooming and focusing, a second lens unit having negative refractive power and movable for zooming, a third lens unit remaining stationary and having a light converging effect with positive refractive power, and a fourth lens unit having positive refractive power and axially movable along an optical axis to keep the image plane position fixed against movements in response to zooming. In the zoom lens disclosed, the second lens unit is composed of a negative meniscus lens, a negative bi-concave lens, and a positive lens, the third lens unit is composed of a single lens element having at least one aspherical surface, and the fourth lens unit is composed of a lens having at least one aspherical surface.

In the above-referenced six disclosures, there is no mention of a zoom lens having the second lens unit composed of four lenses.

U.S. Pat. No. 4,299,454 discloses a zoom lens which includes, in the order from the object end, a first lens unit having positive refractive power, a second negative lens unit, and a rear positive lens unit. Two lenses including at least the second negative lens unit are movable to effect zooming. The second negative lens unit is composed of first and second negative lenses and a positive doublet from the object end. Since the third lens unit moves, the mechanism of the zoom lens become complicated. U.S. Reissue Pat. No. RE32,923 discloses a zoom lens which includes, in the order from the object end, a first positive lens unit, a second negative lens unit, a diaphragm, a third positive lens unit, and a fourth positive lens unit. The first and fourth lens units move in the same direction during zooming, and the diaphragm remains stationary during the zooming. The second lens unit employs a single cemented lens.

In the two U.S. Pat. Nos. 4,299,454 and RE32,923, there is no mention of the third lens unit which has aspherical surfaces on both sides thereof.

Each of Japanese Patent Laid-Open No. 7-270684 and Japanese Patent Laid-Open No. 7-318804 discloses a zoom lens which includes, in the order from the object end, a first lens unit remaining stationary and having positive refractive power, a second lens unit having negative refractive power, for zooming, a third lens unit remaining stationary and having positive refractive power, and a fourth lens unit having positive refractive power and axially movable in the optical axis for keeping the image plane fixed in position against zooming, and for focusing. The second lens unit is composed of four lens elements. In these disclosures, there is no mention of the third lens unit which has aspherical surfaces on the two sides thereof.

Japanese Patent Laid-Open No. 5-060974 discloses a short overall-lens-length zoom lens which includes, in the order from the object end, a first lens unit remaining stationary and having positive refractive power, a second lens unit, having negative refractive power, for zooming, a third lens unit remaining stationary and having positive refractive power, and a fourth lens unit having positive refractive power and axially movable along the optical axis to keep the image plane fixed in position against zooming and to perform focusing. There is neither mention of the second lens unit being composed of four single lens elements nor mention of the third lens unit having aspherical surfaces on the two sides thereof.

The implementation of the rear focus method in the zoom lens typically makes the design of the lens system compact, and permits focusing to be quickly performed, and close-up photographing is easily performed.

On the other hand, variations in aberration during focusing increase, and it is difficult to achieve high optical performance over an object range covering from infinity to a near object.

In particular, it is very difficult to maintain-high optical performance over the object range within an overall zoom range with a simplified construction of a zoom lens having a large zoom ratio and a high aperture ratio.

SUMMARY OF THE INVENTION

It is an object of the present invention to provide a zoom lens which has high optical performance for a high zoom ratio thereof, and features compact design with a short overall lens length and a simple construction with a reduced number of lens elements, and to provide an optical apparatus incorporating the zoom lens.

It is another object of the present invention to provide a zoom lens which has high optical performance, permitting quick focusing, and suffering from less variation in aberration during focusing.

In one aspect, a zoom lens of the present invention includes, in the order from the object end thereof, a first lens unit having positive refractive power, a second lens unit having negative refractive power and being movable during zooming, and consisting of four single lenses, separated one from another, three of these lenses each having negative refractive power, and one lens having positive refractive power, a third lens unit, having positive refractive power, including at least one lens having positive refractive power and having aspherical surfaces on the two sides thereof, and a fourth lens unit having positive refractive power and being movable during zooming.

In a preferred embodiment, the first lens unit includes, in a position close to the object, a first lens having negative refractive power, a second lens having positive refractive power, and a third lens having positive refractive power, and wherein the condition equation of $1.72<(n12+n13)/2<1.77$ holds where n12 represents the index of refraction of the second lens and n13 represents the index of refraction of the third lens.

In a preferred embodiment, the second lens unit includes a first lens having negative refractive power at the object end thereof, and wherein the condition equation of $0.04<R21r/ft<0.07$ holds where R21r represents the radius of curvature of the first lens on the image side surface thereof and ft represents the focal length of the entire lens system at the telephoto end.

In a preferred embodiment, the second lens unit consists of four lenses having negative, negative, positive, and negative refractive power in the order from the object end thereof.

In a preferred embodiment, the second lens unit consists of, in the order from the object end thereof, a first lens having negative refractive power and having a concave image side surface, a second bi-concave lens having negative refractive power, a third lens element having positive refractive power and having a convex object side surface, and a fourth bi-concave lens having negative refractive power.

In a preferred embodiment, the third lens unit consists of a first bi-convex lens having positive refractive power, and a second meniscus lens having negative refractive power and having a convex object side surface.

In a preferred embodiment, the fourth lens unit consists of two lenses, one having positive refractive power and one having negative refractive power.

In a preferred embodiment, the fourth lens unit includes a first bi-convex lens having positive refractive power, and a second meniscus lens unit having negative refractive power and having a convex image side surface.

In another aspect, an optical apparatus of the present invention includes a zoom lens which includes, in the order from the object end thereof, a first lens unit having positive refractive power, a second lens unit having negative refractive power and being movable during zooming, and consisting of four single lenses, separated one from another, three of these lenses each having negative refractive power, and one lens having positive refractive power, a third lens unit having positive refractive power including at least one lens having positive refractive power and having aspherical surfaces on the two sides thereof, and a fourth lens unit having positive refractive power and being movable during zooming, and a body for supporting the zoom lens.

In a preferred embodiment of the optical apparatus, the first lens unit includes a first lens having negative refractive power, a second lens having positive refractive power, and a third lens having positive refractive power, and wherein the condition equation of $1.72<(n12+n13)/2<1.77$ holds where n12 represents the index of refraction of the second lens and n13 represents the index of refraction of the third lens.

These and further aspects and features of the invention will become apparent from the following detailed description of preferred embodiments thereof taken in conjunction with the accompanying drawings.

BRIEF DESCRIPTION OF THE DRAWINGS

FIGS. 2A–2I are aberration charts of the first numerical example of the present invention at the wide-angle end;

FIGS. 4A–4I are aberration charts of the first numerical example of the present invention at the telephoto end;

FIGS. 7A–7I are aberration charts of the second numerical example of the present invention at an intermediate point;

FIGS. 11A–11I are aberration charts of the third numerical example of the present invention at an intermediate point;

FIGS. 12A–12I are aberration charts of the third numerical example of the present invention at the telephoto end.

DESCRIPTION OF THE PREFERRED EMBODIMENTS

Figure 1A:
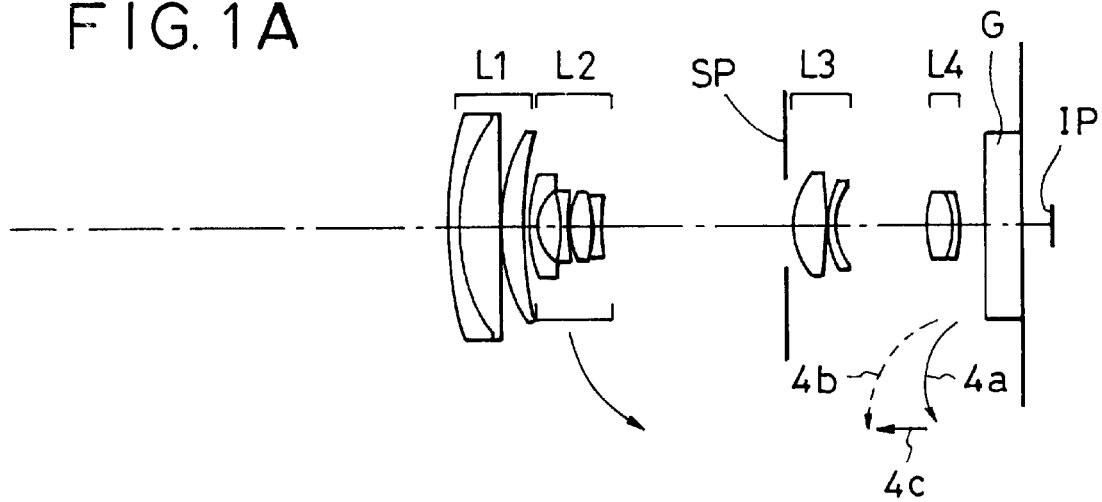
FIGS. 1A–1C show sections of lenses of a first numerical example of the present invention.
Figure 1B:
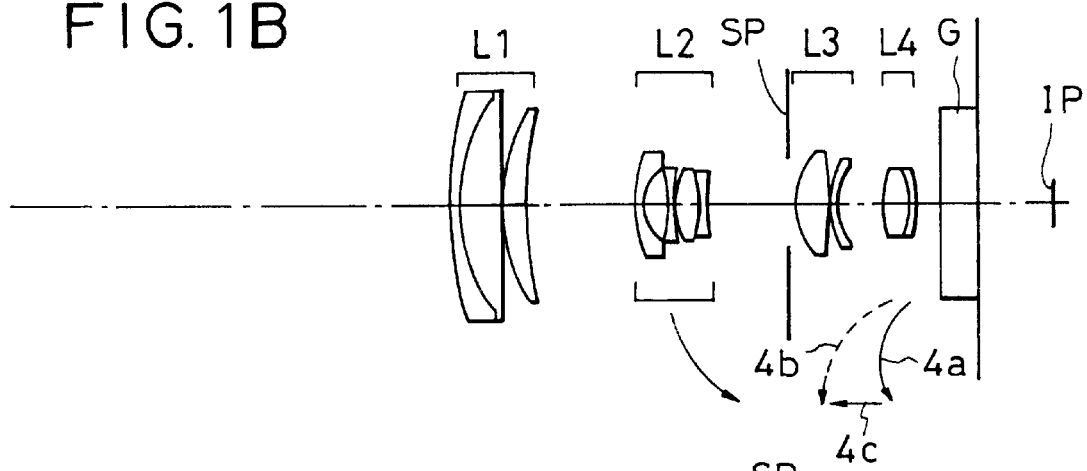
Figure 1C:
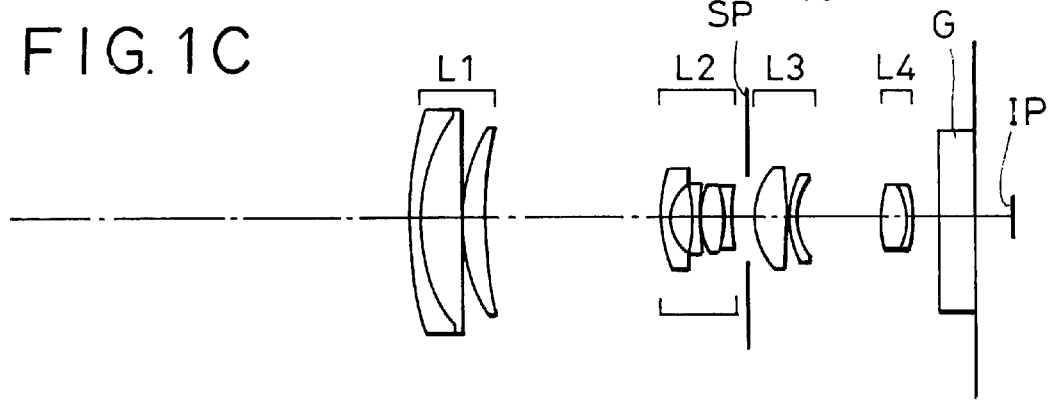
Figures 3A, 3B, 3C, 3D:
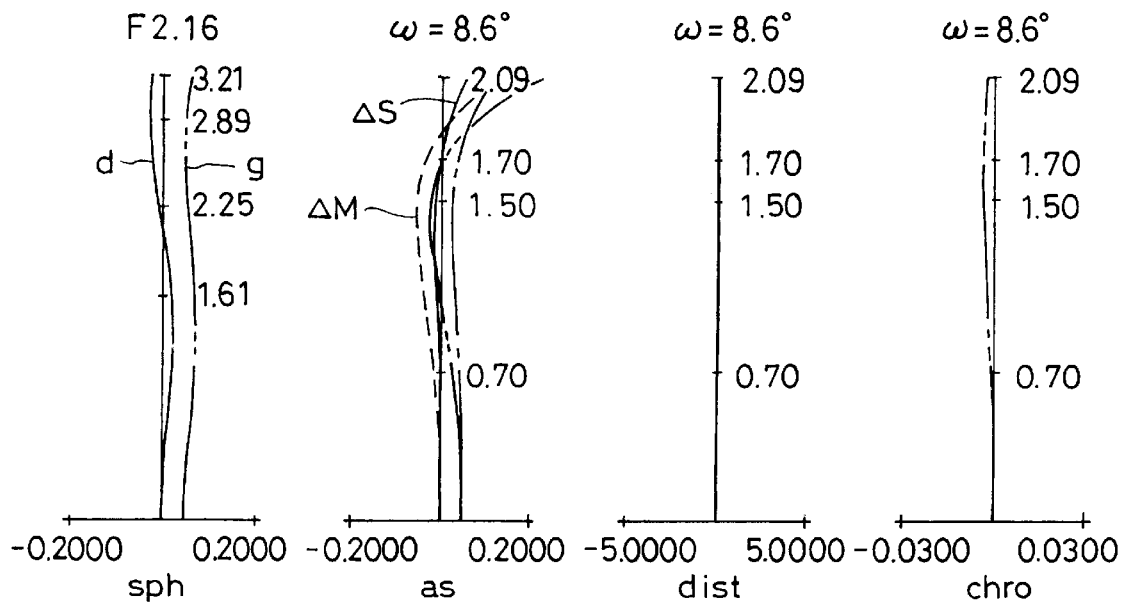
FIGS. 3A–3I are aberration charts of the first numerical example of the present invention at an intermediate point.
Figure 3E:
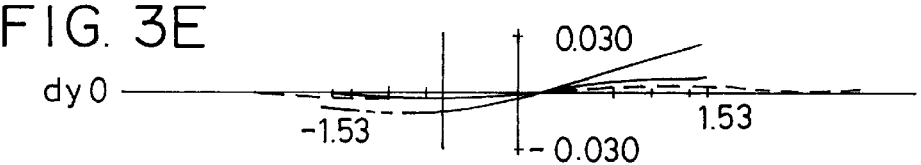
Figure 3F:
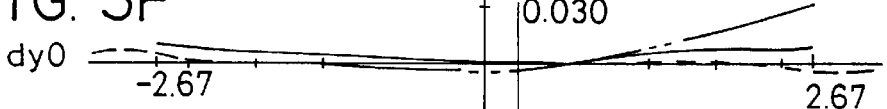
Figure 3G:
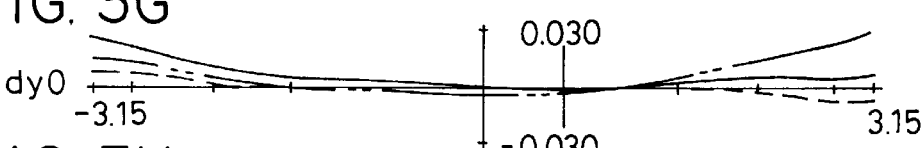
Figure 3H:
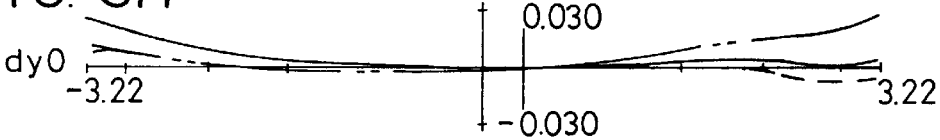
Figure 3I:
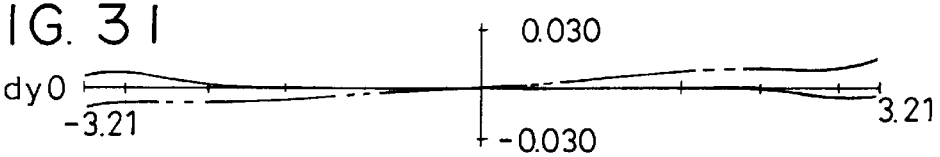

FIGS. 1A–1C are sectional views showing a major portion of one embodiment of a picture-taking device having a rear-focus zoom lens of the present invention. The data of the rear-focus zoom lens is given later as a first numerical example. FIGS. 2A through 4I are aberration charts of the embodiment with the zoom position at the wide-angle end, an intermediate point, and the telephoto end.

Figure 5A:
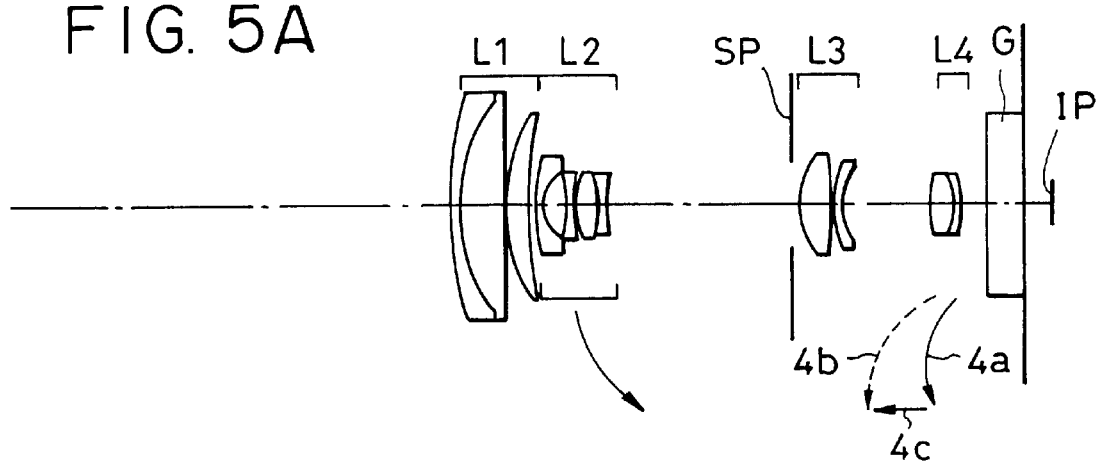
FIGS. 5A–5C show sections of the lenses of a second numerical example of the present invention.
Figure 5B:
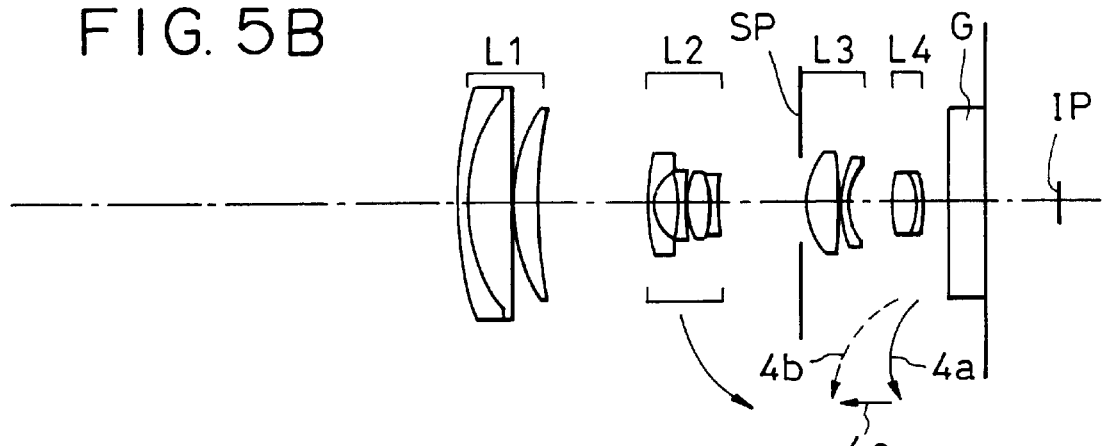
Figure 5C:
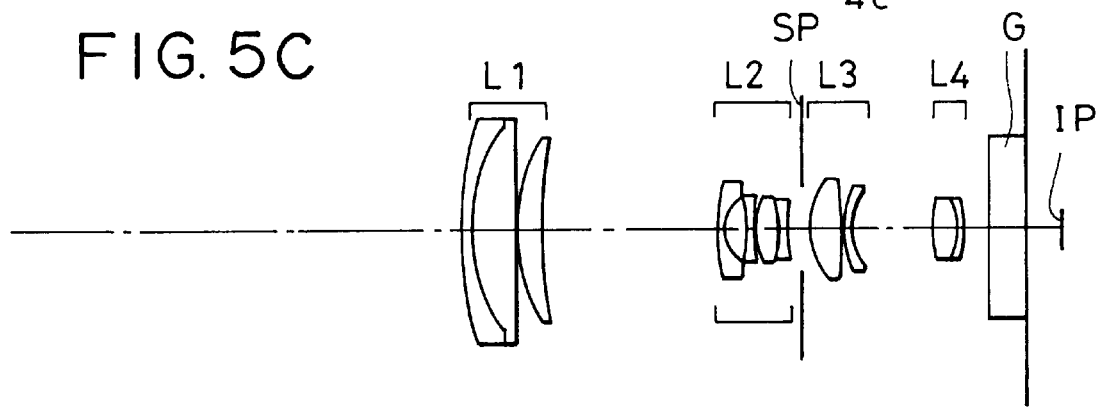
Figures 6A, 6B, 6C, 6D:
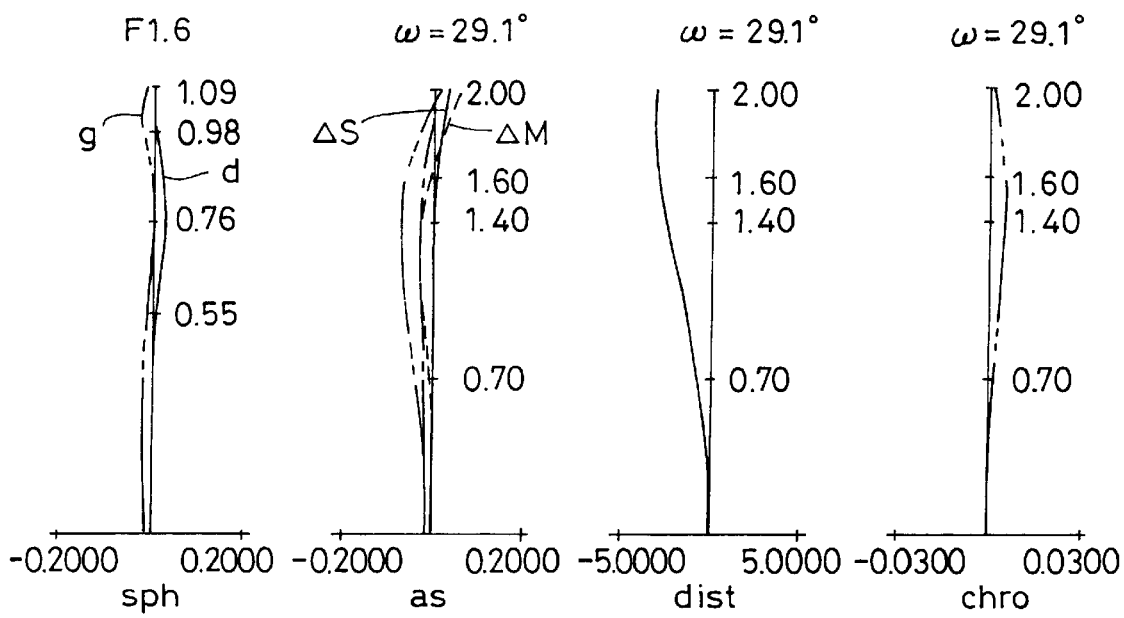
FIGS. 6A–6I are aberration charts of the second numerical example of the present invention at the wide-angle end.
Figure 6E:
Figure 6F:
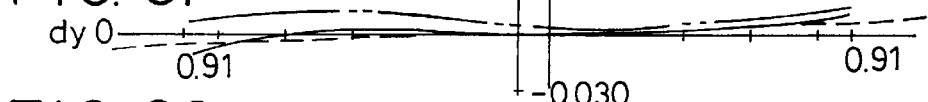
Figure 6G:
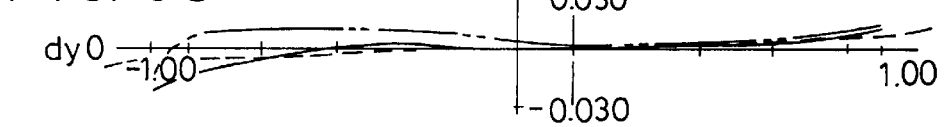
Figure 6H:
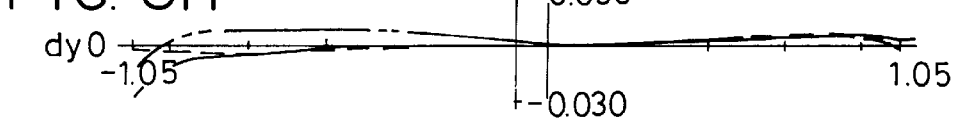
Figure 6I:
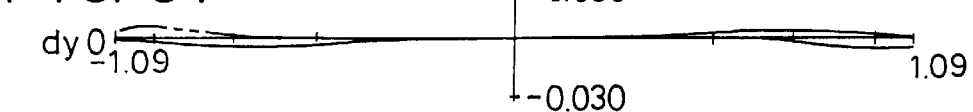
Figures 8A, 8B, 8C, 8D:
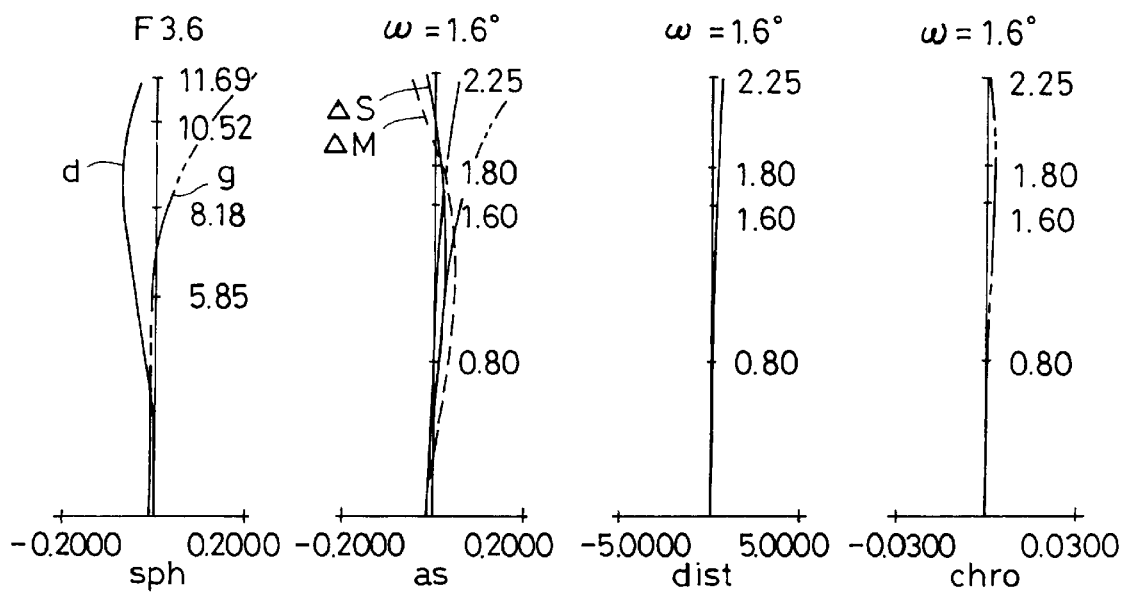
FIGS. 8A–8I are aberration charts of the second numerical example of the present invention at the telephoto end.
Figure 8E:
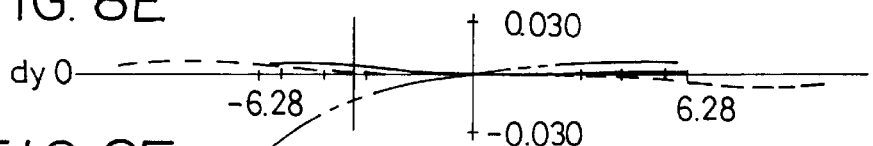
Figure 8F:
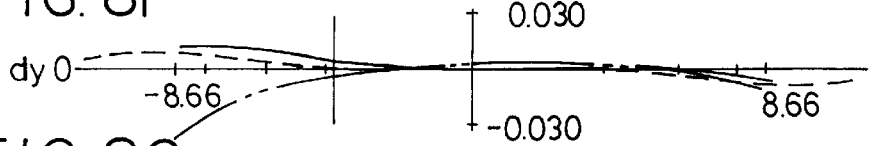
Figure 8G:
Figure 8H:
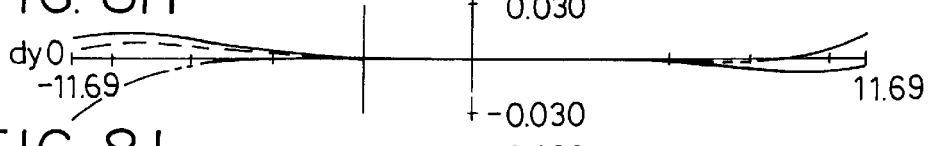
Figure 8I:
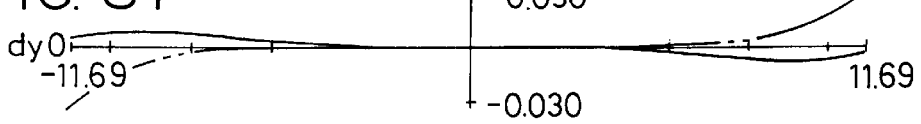

FIGS. 5A–5C are sectional views showing a major portion of a picture-taking device having a rear-focus zoom lens of the present invention. The data of the rear-focus zoom lens is given later as a second numerical example. FIGS. 6A through 8I are aberration charts with the zoom position at the wide-angle end, an intermediate point, and the telephoto end.

Figure 9A:
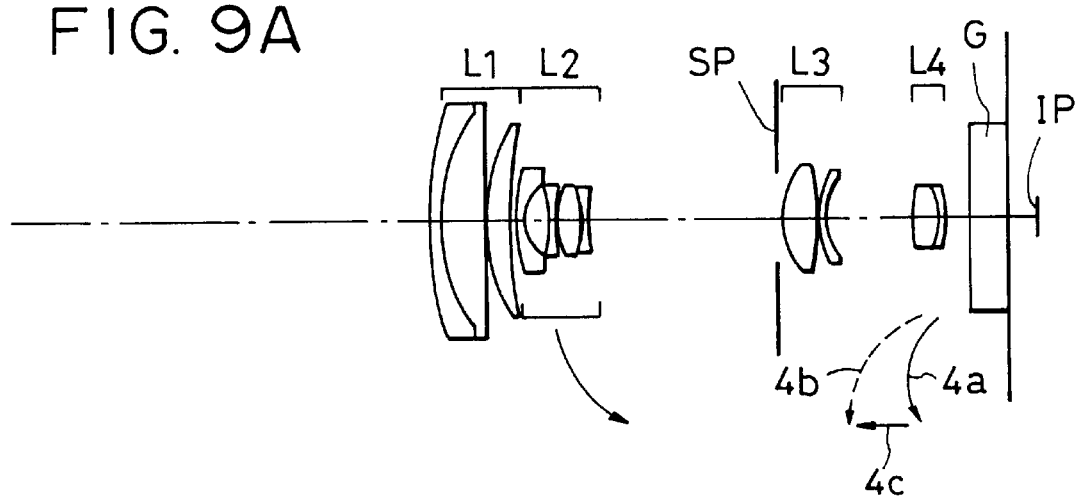
FIGS. 9A–9C show sections of the lenses of a third numerical example of the present invention.
Figure 9B:
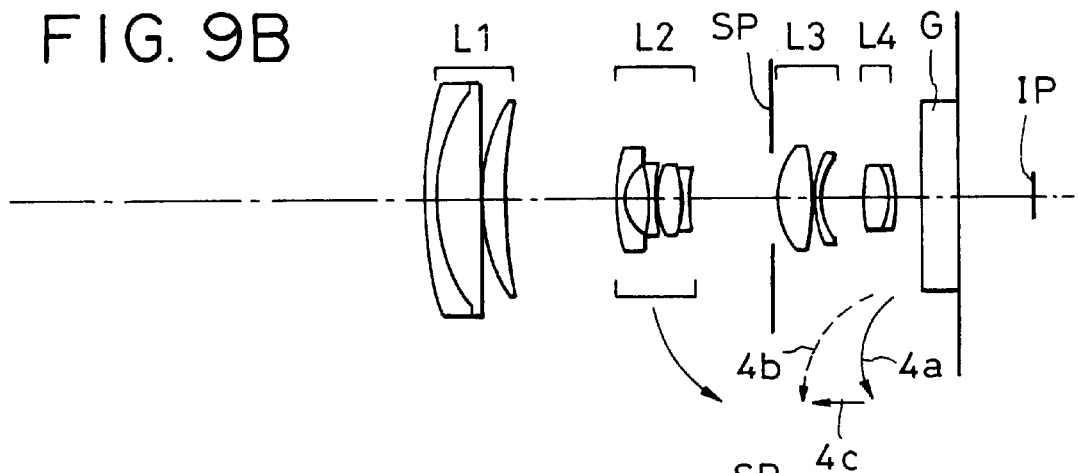
Figure 9C:
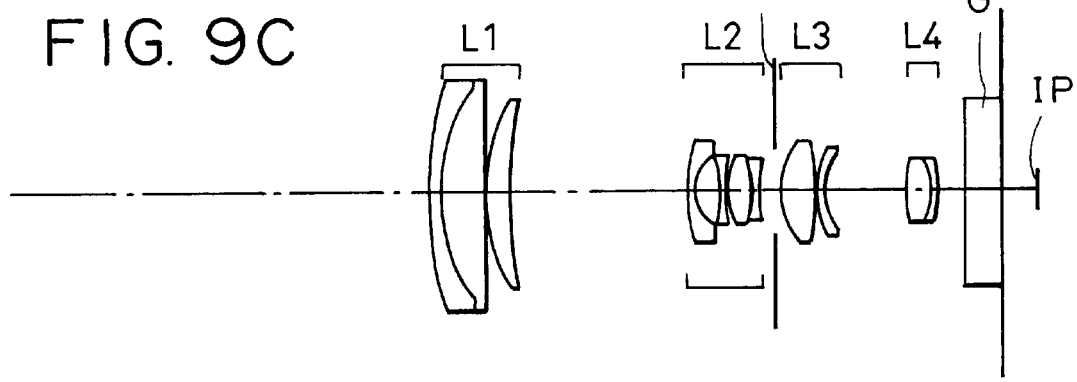
Figures 10A, 10B, 10C, 10D:
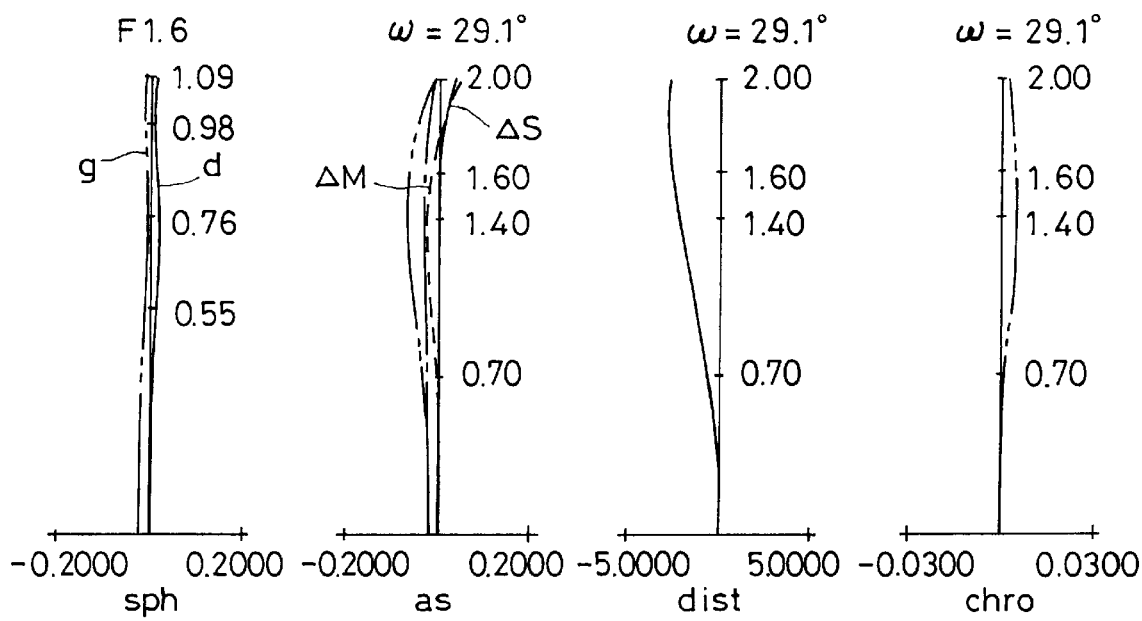
FIGS. 10A–10I are aberration charts of the third numerical example of the present invention at the wide-angle end.
Figure 10E:
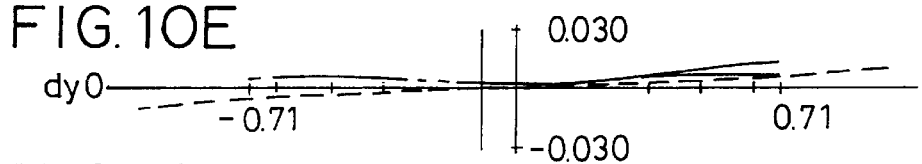
Figure 10F:
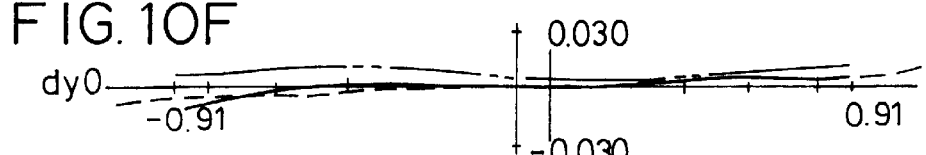
Figure 10G:
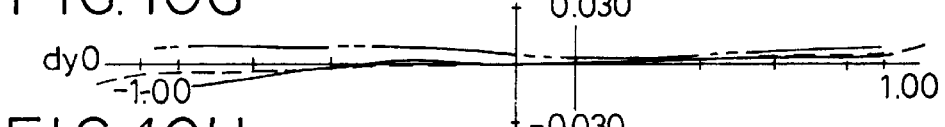
Figure 10H:
Figure 10I:
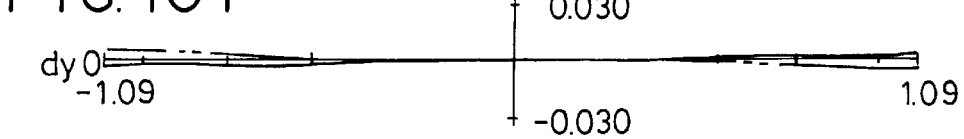

FIGS. 9A–9C are sectional views showing a major portion of a picture-taking device having a rear-focus zoom lens of the present invention. The data of the rear-focus zoom lens is given later as a third numerical example. FIGS. 10A through 12I are aberration charts with the zoom position at the wide-angle end, an intermediate point, and the telephoto end. FIGS. 1A, 5A, and 9A respectively show the zoom position at the wide-angle end, FIGS. 1B, 5B, and 9B respectively show the zoom position at the intermediate point, and FIGS. 1C, 5C, and 9C respectively show the zoom position at the telephoto end.

There are shown a first lens unit L1 having positive refractive power, a second lens unit L2 having negative refractive power, a third lens unit L3 having positive refractive power, and a fourth lens unit L4 having positive refractive power. An aperture diaphragm SP is arranged in front of the third lens unit L3, and a glass block G is a color separating prism, a face plate, or a filter. An image pickup device such as a CCD (Charged-Coupled Device) is arranged at an image plane IP.

In this embodiment, the second lens unit is moved from the wide-angle end to the telephoto end in a zooming operation while a shift of the image plane arising from the zooming operation is compensated for by moving the fourth lens unit in whole or in part (the whole fourth lens unit in this embodiment) in a locus convex toward the object.

Employed here is the rear focus method in which the fourth lens unit in whole or in part (the whole fourth lens unit in this embodiment) is axially moved to effect focusing. With the zoom lens focusing on infinity or a near object, a solid curve line 4a or a dotted curve line 4b respectively represents a locus of the fourth lens unit to compensate for the shift of the image plane resulting from the zooming operation from the wide-angle end to the telephoto end. The first and third lens units remain stationary during the zooming or focusing operation.

The fourth lens unit is moved, compensating for the shift of the image plane involved in the zooming operation while concurrently effecting focusing. As represented by the curve lines 4a and 4b, the fourth lens unit is moved in loci convex toward the object in the zooming operation from the wide-angle end to the telephoto end. This arrangement utilizes effectively the space between the third lens unit and the fourth lens unit while shortening the overall physical length of the lens system.

When the focusing is performed from infinity to a near object at the telephoto end in the embodiment, the fourth lens unit is projected frontward as represented by line 4c.

The feature of the present invention lies in that the second lens unit L2 is composed of four single separate lenses, three negative and one positive, that the third lens unit L3 includes at least one lens element having aspherical surfaces on the two sides thereof, and that the indexes of refraction of the materials n12 and n13 of the positive lenses of the first lens unit satisfy condition equation (1).

$$1.72<(n12+n13)/2<1.77 \quad (1)$$

In the zoom lens of the present invention, the second lens unit L2, greatly contributing to the zooming operation, is arranged as discussed above, thereby reducing the power budget shared among the lenses and reducing the Petzval sum. This arrangement reduces the displacement of the image plane due to the zooming even with a high zoom ratio. Furthermore, optical performance is improved by arranging at least one lens having aspherical surfaces on the two sides thereof in the third lens unit L3 which receives a diverging light beam from the second lens unit L2. This arrangement eliminates the need for an aspherical surface in the fourth lens unit L4, thereby reducing costs. In this embodiment, the lens closest to the object has the aspherical surfaces on the two sides thereof in the third lens unit L3.

The first lens unit L1 includes, in the order from the object end, a negative eleventh lens, a positive twelfth lens, and a positive thirteenth lens. Indexes of refraction n12 and n13 of the materials of the twelfth lens and the thirteenth lens are set to satisfy condition equation (1), thereby making the radius of curvature of each lens less severe, and thinning the thickness of each lens. This leads to the shortening of the overall length of the lens system.

Condition equation (1) relates to the indexes of refraction of the materials of the positive lenses in the first lens unit L1. If the mean of the indexes of refraction becomes too high, exceeding the upper limit, the manufacturing of the lenses becomes difficult. The mean of the indexes of refraction being greater than the upper limit is thus not preferable. If the mean of the indexes of refraction becomes too low, dropping below the lower limit, the radius of curvature of the lens surface becomes severe. To assure an edge thickness of the lens, the thickness of the lens must also be increased. This leads to an increase in the overall length of the lens system. The mean of the indexes of refraction being smaller than the lower limit is thus not preferable, either.

More preferably, the numerical range defined by condition equation (1) is modified as follows:

$$1.73<(n12+n13)/2<1.74 \quad (1a)$$

In this embodiment, the lens system is arranged as discussed above, thereby assuring high optical performance over an overall zoom range and over an overall object range.

The zoom lens of the present invention that satisfies the above condition is thus manufactured. One of the following conditions is preferably satisfied to attain optical performance while maintaining the zoom ratio.

(A-1) The second lens unit L2 includes a twenty-first lens at the closest position thereof, and let R21r represent the radius of curvature of the lens image side surface of the twenty-first lens and ft represent the focal length of the entire system at the telephoto end, and the following condition equation (2) holds.

$$0.04<R21r/ft<0.07 \quad (2)$$

In equation (2), the image side surface of the twenty-first lens, which is closest to the object in the second lens unit, is normalized by the focal length at the telephoto end. If the curvature is milder than the upper limit defined by equation (2), it becomes difficult to correct coma flare in the wide-angle region. If the curvature becomes severe, dropping below the lower limit, the manufacturing of the lens becomes difficult.

The numerical range in equation (2) is preferably modified as follows:

$$0.055<R21r/ft<0.065 \quad (2a)$$

(A-2) The third lens unit L3 includes a positive thirty-first bi-convex lens, and a meniscus negative thirty-second lens having a convex object side surface.

(A-3) The second lens unit L2 includes four lenses of negative, negative, positive, and negative in the order from the object end thereof.

(A-4) The fourth lens unit L4 includes two lenses, one negative and one positive.

(A-5) The second lens unit L2 includes, in the order from the object end, a negative twenty-first lens having a strongly concave image side surface, a negative twenty-second bi-concave lens, a positive twenty-third lens having a convex object side surface, preferably strongly convex, and a negative twenty-fourth bi-concave lens.

(A-6) The fourth lens unit L4 includes a positive forty-first bi-convex lens, and a meniscus negative forty-second lens having a convex image side surface.

The zoom lens of the present invention thus performs a quick zooming operation with fewer variations introduced in aberration during focusing, thereby attaining high optical performance.

The rear focus method allows compact design to be implemented in the entire lens system, thereby allowing the zoom lens to focus quickly. The construction of the first lens unit L1 is simple, because the first lens unit L1 remains stationary during the zooming. For its high zoom ratio of 20 or more, the zoom lens attains high optical performance. The lens count is small, and the overall length of the lens system is shortened.

Figure 13:
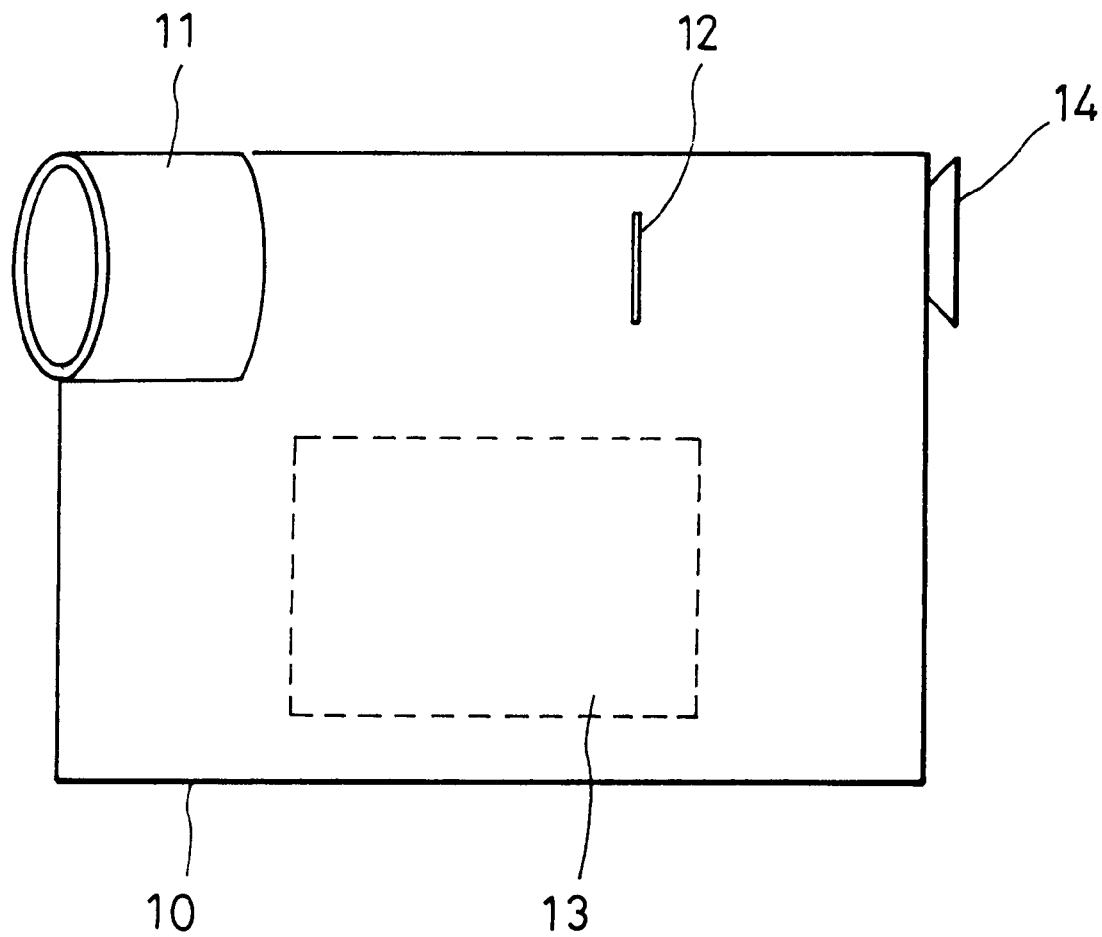
FIG. 13 generally shows an optical apparatus of the present invention.

A video camera (an optical apparatus), employing the zoom lens of the present invention as its image pickup optical system, is now discussed, referring to FIG. 13.

Referring to FIG. 13, there are shown a video camera 10, an image pickup optical system 11 composed of the zoom lens of the present invention, an image pickup device 12,-such as a CCD, receiving the image of an object through the image pickup optical system 11, a recording unit 13 for recording the image received by the image pickup device 12, and a view finder 14 for observing the image of the object provided by a display device (not shown). The display device, composed of a liquid-crystal panel, for instance, displays the image of the object formed on the image pickup device 12.

A compact optical apparatus having high optical performance is thus manufactured by incorporating the zoom lens of the present invention into an optical apparatus such as a video camera.

The first through third numerical examples of the lenses of the present invention are listed below.

In each numerical example, Ri represents the radius of curvature of an i-th surface from the object end, Di represents the gap between the i-th surface and an (i+1)-th surface from the object end, and Ni and vi respectively represent the index of refraction and the Abbe number of an i-th glass optical member from the object end.

The shape of the aspheric surface is expressed in the coordinates with the X axis in the optical axis and the H axis in a direction perpendicular to the optical axis, the direction of travel of light is taken as positive, R is the radius of the osculating sphere, and K, B, C, D, E, and F are the aspheric coefficients, and the following equation (3) holds.

$$X = \frac{(1/R)H^2}{1 + \sqrt{1 - (1+K)(H/R)^2}} + BH^4 + CH^6 + DH^8 + EH^{10} \quad (3)$$

In the values of the aspheric coefficients, the notation "e-Z" means $10^{-z}$.

The last three lens surfaces in the numerical examples are glass blocks such as a face plate or a filter. Table 1 lists the relationship between each of the condition equations and values in each of the numerical examples of the embodiment.

The First Numerical Example

| The First Numerical Example | | | |
|---|---|---|---|
| f = 3.70–83.21 | Fno = 1.65–3.6 | 2ω = 56.8–3.1 | |
| R1 = 41.972 | D1 = 1.10 | N1 = 1.846660 | v1 = 23.9 |
| R2 = 20.411 | D2 = 4.50 | N2 = 1.696797 | v2 = 55.5 |
| R3 = 593.259 | D3 = 0.15 | | |
| R4 = 20.927 | D4 = 2.50 | N3 = 1.772499 | v3 = 49.6 |
| R5 = 51.789 | D5 = Variable | | |
| R6 = 19.005 | D6 = 0.70 | N4 = 1.882997 | v4 = 40.8 |
| R7 = 4.996 | D7 = 2.82 | | |
| R8 = −14.156 | D8 = 0.60 | N5 = 1.834807 | v5 = 42.7 |
| R9 = 31.325 | D9 = 0.04 | | |
| R10 = 8.379 | D10 = 2.60 | N6 = 1.846660 | v6 = 23.9 |
| R11 = −19.128 | D11 = 0.31 | | |
| R12 = −9.376 | D12 = 0.60 | N7 = 1.804000 | v7 = 46.6 |
| R13 = 20.005 | D13 = Variable | | |
| R14 = Diaphragm | D14 = 0.70 | | |
| *R15 = 8.451 | D15 = 3.65 | N8 = 1.583126 | v8 = 59.4 |
| *R16 = −23.424 | D16 = 0.15 | | |
| R17 = 11.097 | D17 = 0.70 | N9 = 1.846660 | v9 = 23.9 |
| R18 = 7. 069 | D18 = Variable | | |
| R19 = 12.620 | D19 = 3.00 | N10 = 1.516330 | v10 = 64.1 |
| R20 = −7.111 | D20 = 0.60 | N11 = 1.805181 | v11 = 25.4 |
| R21 = −12.389 | D21 = 2.71 | | |
| R22 = Infinity | D22 = 4.00 | N12 = 1.516330 | v12 = 64.2 |
| R23 = Infinity | D23 = 0.00 | | |
| R24 = Infinity | | | |
| Focal length | 3.7 | 13.87 | 83.21 |
| Variable separation | | | |
| D5 | 0.70 | 12.02 | 19.26 |
| D13 | 20.36 | 9.04 | 1.80 |
| D18 | 10.17 | 5.15 | 11.66 |

Aspherical Coefficients

Fifteenth surface: K=−4.14531e+00

B=7.92437e−04  C=−1.70529e−05  D=3.23520e−07  E=2.95570e−09

Sixteenth surface: K=−2.07521e+01

B=1.1238e−04  C=−8.68267e−06  D=3.41507e−07  E=2.96413e−09

The Second Numerical Example

| The Second Numerical Example | | | |
|---|---|---|---|
| f = 3.60–80.96 | Fno = 1.65–3.6 | 2ω = 58.1–3.2 | |
| R1 = 43.270 | D1 = 1.10 | N1 = 1.846660 | v1 = 23.9 |
| R2 = 20.378 | D2 = 4.80 | N2 = 1.696797 | v2 = 55.5 |
| R3 = 1106.334 | D3 = 0.15 | | |
| R4 = 20.679 | D4 = 2.60 | N3 = 1.772499 | v3 = 49.6 |
| R5 = 51.393 | D5 = Variable | | |
| R6 = 19.780 | D6 = 0.70 | N4 = 1.882997 | v4 = 40.8 |
| R7 = 4.567 | D7 = 2.81 | | |
| R8 = −14.203 | D8 = 0.60 | N5 = 1.834807 | v5 = 42.7 |
| R9 = 24.982 | D9 = 0.20 | | |
| R10 = 8.742 | D10 = 2.60 | N6 = 1.846660 | v6 = 23.9 |
| R11 = −13.932 | D11 = 0.23 | | |
| R12 = −9.428 | D12 = 0.60 | N7 = 1.804000 | v7 = 46.6 |
| R13 = 23.567 | D13 = Variable | | |
| R14 = Diaphragm | D14 = 0.70 | | |
| *R15 = 8.168 | D15 = 3.72 | N8 = 1.583126 | v8 = 59.4 |
| *R16 = −23.701 | D16 = 0.15 | | |

-continued

The Second Numerical Example
f = 3.60–80.96    Fno = 1.65–3.6    2ω = 58.1–3.2

| | | | |
|---|---|---|---|
| R17 = 11.589 | D17 = 0.70 | N9 = 1.846660 | ν9 = 23.9 |
| R18 = 7.067 | D18 = Variable | | |
| R19 = 12.208 | D19 = 3.00 | N10 = 1.516330 | ν10 = 64.1 |
| R20 = −6.973 | D20 = 0.60 | N11 = 1.805181 | ν11 = 25.4 |
| R21 = −12.592 | D21 = 2.71 | | |
| R22 = Infinity | D22 = 4.00 | N12 = 1.516330 | ν12 = 64.2 |
| R23 = Infinity | D23 = 0.00 | | |
| R24 = Infinity | | | |
| Focal length | 3.60 | 13.49 | 80.96 |
| Variable separation | | | |
| D5 | 0.70 | 12.07 | 19.34 |
| D13 | 20.34 | 8.98 | 1.71 |
| D18 | 9.65 | 4.81 | 11.19 |

Aspherical Coefficients

Fifteenth surface: K=−5.05661e+00

B=1.05132e−03  C=−3.01859e−05  D=8.62996e−07  E=−1.06064e−08

Sixteenth surface: K=−3.21159e+00

B=3.00621e−04  C=−1.04283e−06  D=5.07044e−07  E=−8.77225e−09

The Third Numerical Example

The Third Numerical Example
f = 3.60–80.71    Fno = 1.65–3.6    2ω = 56.8–3.2

| | | | |
|---|---|---|---|
| R1 = 43.059 | D1 = 1.10 | N1 = 1.846660 | ν1 = 23.9 |
| R2 = 20.318 | D2 = 4.90 | N2 = 1.696797 | ν2 = 55.5 |
| R3 = 1136.271 | D3 = 0.15 | | |
| R4 = 20.780 | D4 = 2.60 | N3 = 1.772499 | ν3 = 49.6 |
| R5 = 52.098 | D5 = Variable | | |
| R6 = 19.891 | D6 = 0.70 | N4 = 1.882997 | ν4 = 40.8 |
| R7 = 4.609 | D7 = 2.87 | | |
| R8 = −13.845 | D8 = 0.60 | N5 = 1.834807 | ν5 = 42.7 |
| R9 = 26.613 | D9 = 0.18 | | |
| R10 = 8.844 | D10 = 2.60 | N6 = 1.846660 | ν6 = 23.9 |
| R11 = −13.814 | D11 = 0.21 | | |
| R12 = −9.521 | D12 = 0.60 | N7 = 1.804000 | ν7 = 46.6 |
| R13 = 22.786 | D13 = Variable | | |
| R14 = Diaphragm | D14 = 0.70 | | |
| *R15 = 8.453 | D15 = 3.80 | N8 = 1.583126 | ν8 = 59.4 |
| *R16 = −23.391 | D16 = 0.15 | | |
| R17 = 11.324 | D17 = 0.70 | N9 = 1.846660 | ν9 = 23.9 |
| R18 = 7.102 | D18 = Variable | | |
| R19 = 12.394 | D19 = 3.00 | N10 = 1.516330 | ν10 = 64.1 |
| R20 = −6.814 | D20 = 0.60 | N11 = 1.805181 | ν11 = 25.4 |
| R21 = −12.304 | D21 = 2.71 | | |
| R22 = Infinity | D22 = 4.00 | N12 = 1.516330 | ν12 = 64.2 |
| R23 = Infinity | D23 = 0.00 | | |
| R24 = Infinity | | | |
| Focal length | 3.60 | 13.52 | 80.71 |
| Variable separation | | | |
| D5 | 0.70 | 12.01 | 19.24 |
| D13 | 20.25 | 8.94 | 1.71 |
| D18 | 9.38 | 4.63 | 11.08 |

Aspherical Coefficients

Fifteenth surface: K=−6.52138e+00

B=1.21271e−03  C=−4.21180e−05  D=1.11887e−07  E=−1.54763e−08

Sixteenth surface: K=5.27945e+00

B=3.41134e−04  C=−1.34825e−05  D=4.83845e−07  E=−9.25980e−09

TABLE 1

| Numerical Examples | Condition (1) $(n12 + n13)/2$ | Condition (2) $R21r/ft$ |
|---|---|---|
| First example | 1.735 | 0.060 |
| Second example | 1.735 | 0.056 |
| Third example | 1.735 | 0.057 |

The present invention thus provides a zoom lens which has high optical performance for its high zoom ratio, and features a compact design with a short overall lens length and a simple construction with a reduced number of lens elements, and provides an optical apparatus incorporating the zoom lens.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens comprising, in order from the object end thereof:

a first lens unit having positive refractive power;

a second lens unit having negative refractive power and being movable during zooming, and consisting of four single lenses, separated one from another, three of said four single lenses each having negative refractive power, and one lens having positive refractive power;

a third lens unit, having positive refractive power, comprising at least one lens having positive refractive power and having aspherical surfaces on the two sides thereof; and a fourth lens unit having positive refractive power and being movable during zooming, wherein the first lens unit comprises a first lens having negative refractive power, a second lens having positive refractive power, and a third lens having positive refractive power, and wherein the condition of $1.72 < (n12+n13)/2 < 1.77$ holds, where n12 represents the index of refraction of the second lens and n13 represents the index of refraction of the third lens.

2. A zoom lens according to claim 1, wherein the condition of $1.73 < (n12+n13)/2 < 1.74$ holds.

3. A zoom lens according to claim 1, wherein the second lens unit comprises, at a position closest to the object, a first lens having negative refractive power, and wherein the condition of $0.04 < R21r/ft < 0.07$ holds, where R21r represents the radius of curvature of the first lens on the image side surface thereof and ft represents the focal length of the entire lens system at the telephoto end.

4. A zoom lens according to claim 3, wherein the condition of $0.055 < R21r/ft < 0.065$ holds.

5. A zoom lens according to claim 1, wherein the second lens unit consists of four lenses having negative, negative, positive and negative refractive power in order from the object end thereof.

6. A zoom lens according to claim 5, wherein the second lens unit consists of, in order from the object end thereof, a first lens having negative refractive power and having a concave image side surface, a second bi-concave lens having negative refractive power, a third lens having positive refractive power and having a convex object side surface, and a fourth bi-concave lens having negative refractive power.

7. A zoom lens according to claim 1, wherein the third lens unit consists of a first bi-convex lens having positive refractive power, and a second meniscus lens having negative refractive power and having a convex object side surface.

8. A zoom lens according to claim 1, wherein the fourth lens unit consists of two lenses, one having positive refractive power and one having negative refractive power.

9. A zoom lens according to claim 1, wherein the fourth lens unit consists a first bi-convex lens having positive refractive power, and a second meniscus lens unit having negative refractive power and having a convex image side surface.

10. An optical apparatus comprising a zoom lens, the zoom lens comprising in order from the object end thereof:

a first lens unit having positive refractive power;

a second lens unit having refractive power and being movable during zooming, and consisting of four single lenses, separated one from another, three of said single lenses each having negative refractive power, and one lens having positive refractive power;

a third lens unit having positive refractive power comprising at least one lens having positive refractive power and having aspherical surfaces on the two sides thereof;

a fourth lens unit having positive refractive power and being movable during zooming; and image pick up element for receiving the image which the zoom lens forms, wherein the first lens unit comprises a first lens having negative refractive power, a second lens having positive refractive power, and a third lens having positive refractive power, and wherein the condition of $1.72<(n12+n13)/2<1.77$ holds, where n12 represents the index of refraction of the second lens and n13 represents the index of refraction of the third lens.

* * * * *

UNITED STATES PATENT AND TRADEMARK OFFICE
CERTIFICATE OF CORRECTION

PATENT NO. : 6,476,977 B1 Page 1 of 1
DATED : November 5, 2002
INVENTOR(S) : Yoshinori Ito It is certified that error appears in the above-identified patent and that said Letters Patent is hereby corrected as shown below:

Column 2,
Line 28, "become" should read -- becomes --.

Column 3,
Line 7, "maintain-high" should read -- maintain high --.

Column 7,
Line 52, "vi" should read -- υi --

Column 8,
Line 44, "B=1.1238e-04" should read -- B=1.71238e-4 --

Column 11,
Line 14, "consists" should read -- consists of --

Signed and Sealed this

Fifth Day of August, 2003

JAMES E. ROGAN
*Director of the United States Patent and Trademark Office*